United States Patent
Jao et al.

(10) Patent No.: US 8,090,056 B2
(45) Date of Patent: *Jan. 3, 2012

(54) SYSTEM AND METHOD FOR ANTICIPATORY RECEIVER SWITCHING BASED ON SIGNAL QUALITY ESTIMATION

(75) Inventors: Tjo San Jao, Beaconsfield (CA); Richard Bourdeau, St-Laurent (CA)

(73) Assignee: Harris Stratex Networks, Inc., Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/503,805

(22) Filed: Jul. 15, 2009

(65) Prior Publication Data
US 2009/0274205 A1 Nov. 5, 2009

Related U.S. Application Data

(63) Continuation of application No. 11/452,216, filed on Jun. 14, 2006, now Pat. No. 7,570,713.

(51) Int. Cl.
*H04L 27/00* (2006.01)
(52) U.S. Cl. .......... 375/324; 375/230; 375/346
(58) Field of Classification Search .......... 375/320, 375/346, 344, 261, 39, 316, 238, 239; 455/226.3, 455/277, 272, 278.1
See application file for complete search history.

(56) References Cited

U.S. PATENT DOCUMENTS

| | | | | |
|---|---|---|---|---|
| 5,438,589 A * | 8/1995 | Nakamura | ...... | 375/145 |
| 5,440,268 A * | 8/1995 | Taga et al. | ...... | 329/308 |
| 5,471,508 A * | 11/1995 | Koslov | ...... | 375/344 |
| 5,828,699 A | 10/1998 | Heinemann | | |
| 5,838,737 A * | 11/1998 | Yamaguchi et al. | ...... | 375/331 |
| 6,133,785 A * | 10/2000 | Bourdeau | ...... | 329/304 |
| 6,580,394 B2 | 6/2003 | Wang et al. | | |
| 6,922,549 B2 | 7/2005 | Lyons et al. | | |
| 7,046,653 B2 | 5/2006 | Nigrin et al. | | |
| 7,099,380 B1 | 8/2006 | Feng et al. | | |
| 7,333,566 B2 | 2/2008 | Nakao et al. | | |
| 2004/0096023 A1* | 5/2004 | Bourdeau | ...... | 375/362 |

OTHER PUBLICATIONS

PCT International Search Report and Written Opinion dated Apr. 21, 2008, for International Application No. PCT/US07/18088.

* cited by examiner

*Primary Examiner* — Shuwang Liu
*Assistant Examiner* — Helene Tayong
(74) *Attorney, Agent, or Firm* — Sheppard, Mullin, Richter & Hampton, LLP

(57) ABSTRACT

In various embodiments, a first and second complex multiplier may be configured to receive an input signal and provide a baseband I component signal and a baseband Q component signal, respectively. A first and second filter may be configured to filter the baseband I component signal and the baseband Q component signal, respectively. An equalizer may be configured to equalize the filtered baseband I component signal and the filtered baseband Q component signal. A carrier recovery portion may be configured to generate a reference signal based on the equalized filtered baseband I component signal and the equalized filtered baseband Q component signal. A first and second multilevel comparator may be configured to receive the equalized filtered baseband I component signal from the carrier recovery portion and provide an output I and receive the equalized filtered baseband Q component signal and provide an output Q signal for further modulation.

14 Claims, 6 Drawing Sheets

SYSTEM AND METHOD FOR ANTICIPATORY RECEIVER SWITCHING BASED ON SIGNAL QUALITY ESTIMATION

CROSS REFERENCE TO RELATED APPLICATION

The present application is a continuation of, and claims priority under 35 U.S.C. § 120 to, U.S. patent application Ser. No. 11/452,216 filed Jun. 14, 2006, entitled "System and Method for Anticipatory Receiver Switching Based on Signal Quality Estimation," which is expressly incorporated fully herein by reference.

BACKGROUND

Radio communication systems are becoming more reliable, and the Mean Time Between Failure (MTBF) associated therewith is high. However, in microwave radio transmission, the associated transmission link may be long and multipath may be frequently encountered. Multipath refers to multiple transmission paths between transmit and receive antennas of a communication system. Multipath may result in both frequency-selective fading and space-selective fading. Frequency-selective fading generally indicates that a channel varies with frequency. Space-selective fading generally indicates that a channel is dependent upon the position of the respective transmit and receive antennas. When multipath interferes with reception of a radio transmission signal, the received signal is distorted causing errors in the corresponding demodulated data stream.

FIG. 1A illustrates an arrangement of symbol points in accordance with a 4 QAM (Quadrature Amplitude Modulation) method on an I-Q coordinate plane. With reference to FIG. 1A, a symbol point of a received signal corresponds to any of four signal points positioned concentrically on the I-Q coordinate plane. Therefore, it is possible to transmit at one time 2 bits of data representing any of the four signal points.

Advances in radio communication systems, however, require data transmission of larger volume at higher speeds. Accordingly, multiple value (M-ary) modulation methods having values larger than the 4 QAM modulation method described above have been developed. As an example of such an M-ary modulation method, 16 QAM is commonly employed in data communications. FIG. 1B is an illustration of an arrangement of symbol points in accordance with the 16 QAM modulation method on the I-Q coordinate plane. With reference to FIG. 1B, a symbol point of a received signal corresponds to any of a total of 16 signal points on the coordinate plane, arranged four by four in a lattice form in each quadrant of the I-Q coordinate plane. Therefore, it is possible to transmit at one time 4 bits of data representing any of the 16 signal points.

When a modulation method having a larger M-ary number is employed and the communication environment of the propagation path is defective (i.e., if the propagation path has severe interference, noise or encounters multi-path), symbol points may be recognized erroneously since the interval between each of the symbol points is narrow and the symbol points are arranged tightly in the respective modulation method, as may be seen from the arrangement of symbol points of FIG. 1B. Therefore, though this method has a communication speed faster than the 4 QAM modulation method illustrated in FIG. 1A, it is more susceptible to reception errors.

In a radio communication environment prone to multipath, several known techniques may be implemented to mitigate the effects of multipath. Prior art techniques commonly used to protect a signal path include switching from an online channel, receiver or antenna to a standby channel, receiver or antenna by 1+1 Frequency Diversity (FD) or 1+1 Space Diversity (SD) or combination thereof.

SD may commonly be provided by utilizing multiple receive antennas separated by a sufficient distance to take advantage of space-selective fading. With reference to FIG. 2, a prior art method is illustrated that utilizes SD with two receive antennas including a separate receiver connected to each receive antenna. A pair of antennas 201, 202 are coupled to respective receivers 203, 205 that demodulate the signals received at each antenna. An antenna selection circuit 209 accepts the demodulated output of the receivers and provides control to an antenna switch 207 to select a data set having the least amount of error.

The aforementioned diversity techniques and examples, however, are not always appropriate for evaluating the communication quality of the propagation path. For example, different radio reception apparatuses employ different methods of reception and performances. Qualities of components, such as filters used in the reception apparatuses, vary and such differences and variations have an influence on the quality of communication. Conventional parameters such as reception level, frame error rate, and carrier to interference ratios (CIR) do not reflect such quality or performances of the reception apparatuses. Further, as may be seen from a comparison of the modulation methods shown in FIGS. 1A and 1B, even when there is no reception error with a modulation method having smaller M-ary values, it is unpredictable whether there arises reception error or not with another modulation method (16, 64, 128, 256 QAM) having a larger M-ary values (i.e., having dense symbol points on the I-Q plane). As a result, special and complicated procedures and hardware are necessary to measure the respective conventional parameters of the propagation path during communication.

Thus, there is a need in the art for a system and method of selecting antennas or receivers in a multipath environment without incurring any errors in the received signal.

Accordingly, it is an object of the present subject matter to obviate many of the deficiencies in the prior art and to provide a novel method of switching from a first receiver receiving a constant bit rate signal to a second receiver receiving the constant bit rate signal, where the constant bit rate signal received by the first and second receivers is converted to a first baseband signal and a second baseband signal. The method further comprises the steps of estimating a signal quality metric of the first baseband signal, comparing the signal quality metric to a predetermined threshold, and switching from the first baseband signal to the second baseband signal if the signal quality metric is greater than the threshold.

It is also an object of the present subject matter to provide a novel method of switching from a first receiver receiving a constant bit rate signal to a second receiver receiving the constant bit rate signal, where the constant bit rate signal received by the first and second receivers is converted to a first baseband signal and a second baseband signal, respectively. The method further comprises the steps of estimating a first signal quality metric of the first baseband signal, estimating a second signal quality metric of the second baseband signal, comparing the first signal quality metric to the second signal quality metric, and switching from the first baseband signal to the second baseband signal if the first signal quality metric is greater than the second signal quality metric.

It is another object of the present subject matter to provide a novel system for switching from a first receiver receiving a constant bit rate signal to a second receiver receiving the constant bit rate signal. The system comprises a first converting circuit for converting the signal from the first receiver to a first baseband signal and a second converting circuit for converting the signal from the second receiver to a second baseband signal. The system further comprises an estimating circuit for estimating a first signal quality metric of the first baseband signal, a comparing circuit for comparing the first signal quality metric to a predetermined threshold, and a switching circuit for switching from the first baseband signal to the second baseband signal if the first signal quality metric is greater than the predetermined threshold.

It is still an object of the present subject matter to provide a novel system of switching from a first receiver receiving a constant bit rate signal to a second receiver receiving the constant bit rate signal comprising a first converting circuit for converting the signal from the first receiver to a first baseband signal and a second converting circuit for converting the signal from the second receiver to a second baseband signal. The system also comprises a first estimating circuit for estimating a first signal quality metric of the first baseband signal, a second estimating circuit for estimating a second signal quality metric of the second baseband signal, a comparing circuit for comparing the first signal quality metric to the second signal quality metric, and a switching circuit for switching from the first baseband signal to the second baseband signal if the first signal quality metric is greater than the second signal quality metric.

These and many other objects and advantages of the present invention will be readily apparent to one skilled in the art to which the invention pertains from a perusal of the claims, the appended drawings, and the following detailed description of the preferred embodiments.

SUMMARY OF THE INVENTION

In various embodiments, a system comprises a first and second complex multiplier, a first and second filter, an equalizer, a carrier recovery portion, and a first and second multilevel comparator. The first complex multiplier may be configured to receive an input signal and provide a baseband I component signal. The second complex multiplier may be configured to receive the input signal and provide a baseband Q component signal. The first filter may be configured to filter the baseband I component signal. The second filter may be configured to filter the baseband Q component signal. The equalizer may be configured to equalize the filtered baseband I component signal and to equalize the filtered baseband Q component signal. The carrier recovery portion may be configured to generate a reference signal based on the equalized filtered baseband I component signal and the equalized filtered baseband Q component signal. The first multilevel comparator may be configured to receive the equalized filtered baseband I component signal from the carrier recovery portion and provide an output I signal for further demodulation. The second multilevel comparator may be configured to receive the equalized filtered baseband Q component signal from the carrier recovery portion and provide an output Q signal for further demodulation.

The system may further comprise a lookup table (LUT) wherein the LUT provides a sine signal to the first complex multiplier and a cosine signal to the second complex multiplier. The sine signal and the cosine signal may be based on the reference signal from the carrier recovery portion. Further, the sine signal may be substantially the same carrier frequency and is in phase with the input signal and the cosine signal may be substantially the same carrier frequency and is in quadrature phase with the input signal.

The system may also further comprise a signal quality estimation circuit configured to estimate a signal quality based on the filtered baseband I component signal and the filtered baseband Q component signal. The signal quality estimation circuit may be configured to estimate a signal quality based on the equalized filtered baseband I component signal and the equalized filtered baseband Q component signal. Further, the signal quality estimation circuit may be configured to estimate a signal quality based on the equalized filtered baseband I component signal received form the carrier recovery portion and the equalized filtered baseband Q component signal received from the carrier recovery portion.

The signal quality estimation circuit may comprise a distance calculator, an average calculator, and a comparator. The distance calculator may be configured to determine a distance between an ideal symbol and a received symbol of the equalized filtered baseband I component signal and the equalized filtered baseband Q component signal. The average calculator may be configured to determine an average distance between based on the distance from the distance calculator. The comparator may be configured to compare the average distance to a predetermined threshold. The signal quality estimation circuit may be further configured to generate an alert signal when a quality is low based on the comparison of the average distance to the predetermined threshold.

In various embodiments, a method may comprise multiplying an input signal with a sine signal to provide a baseband I component signal, multiplying the input signal with a cosine signal to provide a baseband Q component signal, filtering the baseband I component signal, filtering the baseband Q component signal, equalizing the filtered baseband I component signal, equalizing the filtered baseband Q component signal, generating a reference signal based on the equalized filtered baseband I component signal and the equalized filtered baseband Q component signal, comparing the equalized filtered baseband I component signal to provide an output I signal for further demodulation, and comparing the equalized filtered baseband Q component signal to provide an output Q signal for further demodulation.

A system may comprise a means for multiplying an input signal with a sine signal to provide a baseband I component signal, a means for multiplying the input signal with a cosine signal to provide a baseband Q component signal, a means for filtering the baseband I component signal, a means for filtering the baseband Q component signal, a means for equalizing the filtered baseband I component signal, a means for equalizing the filtered baseband Q component signal, a means for generating a reference signal based on the equalized filtered baseband I component signal and the equalized filtered baseband Q component signal, a means for comparing the equalized filtered baseband I component signal to provide an output I signal for further demodulation, and a means for comparing the equalized filtered baseband Q component signal to provide an output Q signal for further demodulation.

DETAILED DESCRIPTION OF THE FIGURES

With reference to the figures where like elements have been given like numerical designations to facilitate an understanding of the present invention, the various embodiments of a system and method for switching from a first receiver to a second receiver without error in a received signal by utilizing signal quality estimation are described. Switching according to embodiments of the present subject matter may be conducted in conjunction with 1+1 or 1 for N protected radio links or other transmission media to thereby protect against signal path disturbance, equipment degradation or equipment failure and to achieve high data availability carried through such media. Furthermore, embodiments of the present subject matter estimate signal quality of a received signal derived from the decision directed coherent demodulation of M-ary/M-state QAM/PSK (i.e., 4 QAM (PSK) to 256 QAM (PSK) or higher).

Figure 1B:
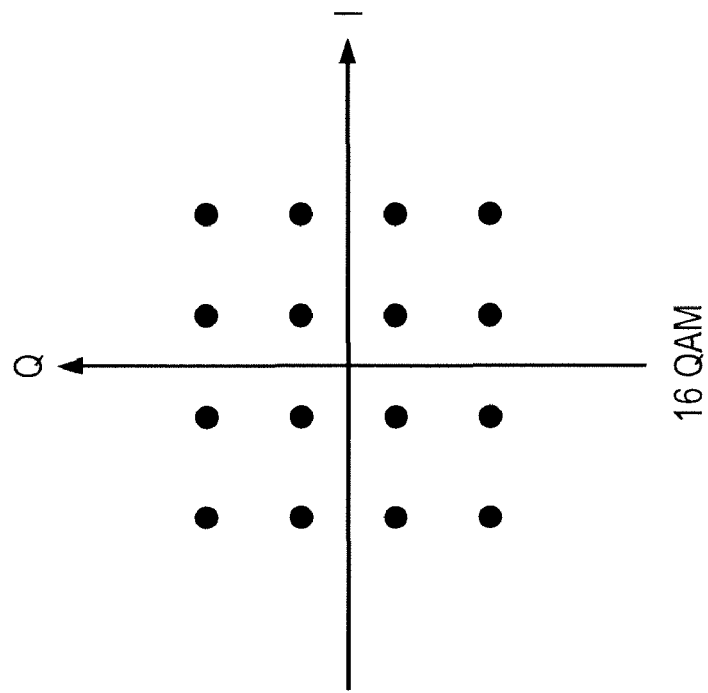
FIGS. 1a and 1b illustrate a representation of arrangements of symbol points of 4 QAM and 16 QAM, respectively, on an I-Q coordinate plane.
Figure 1A:
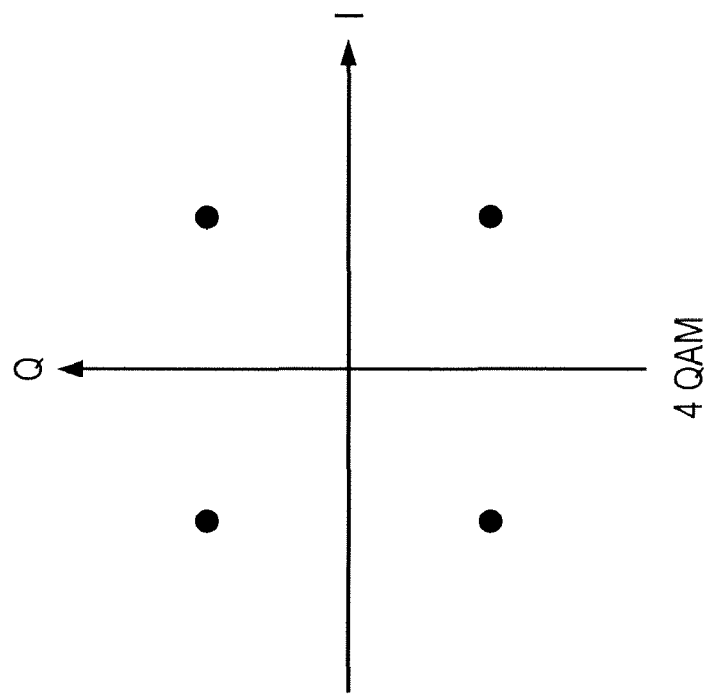
Figure 2:
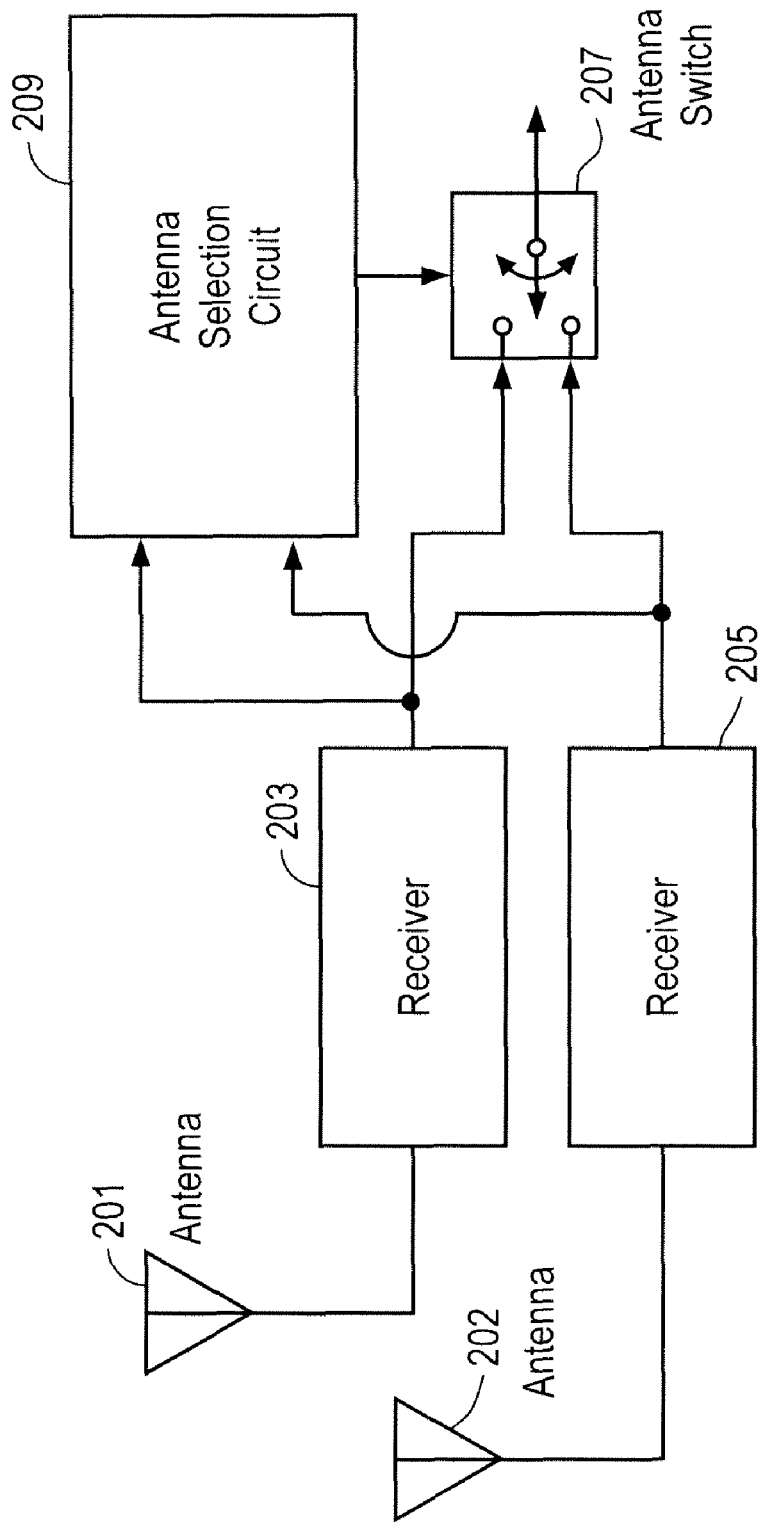
FIG. 2 is a simplified block diagram of a prior art receiving apparatus that includes two receivers and compares the received signals after demodulation to select an antenna for reception.
Figure 3:
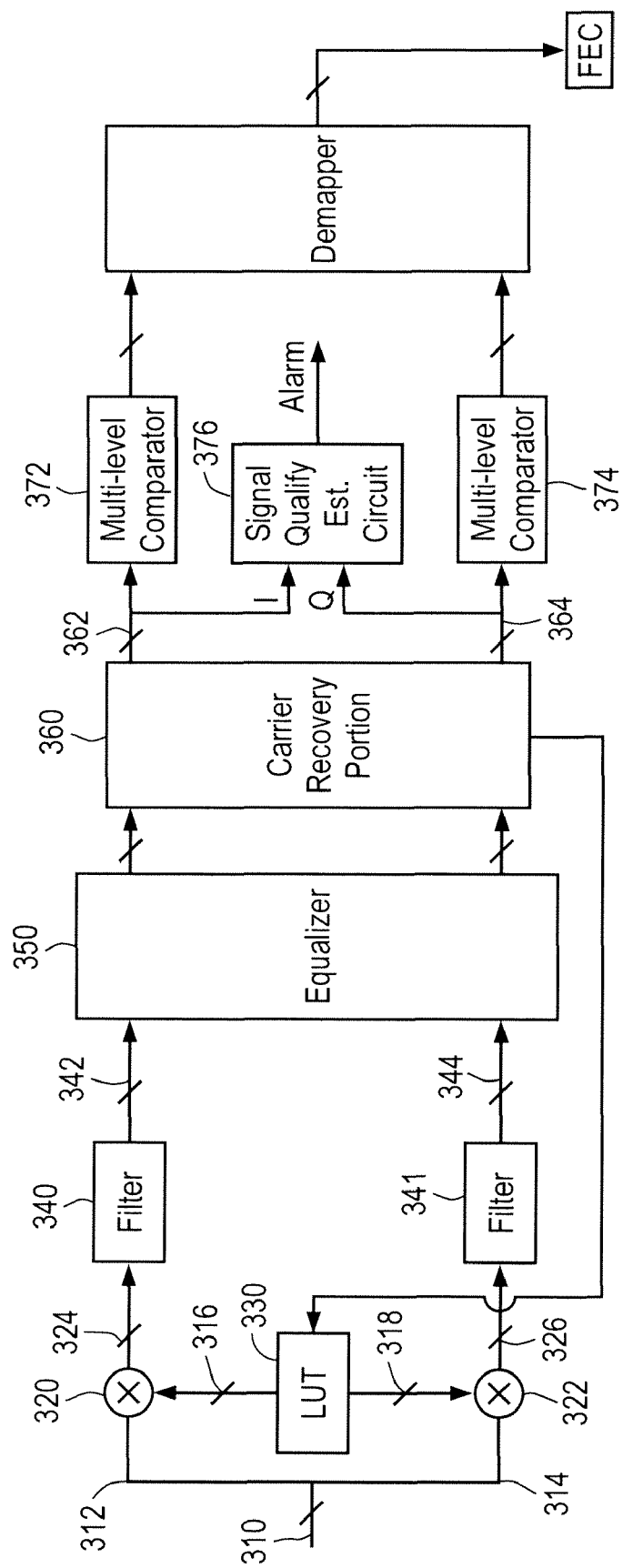
FIG. 3 is a simplified block diagram of a signal quality estimation circuit according to an embodiment of the present subject matter.

A system and method according to the present subject matter may utilize an exemplary signal quality estimation circuit illustrated by FIG. 3. With reference to FIG. 3, a functional block diagram of a front end portion of a demodulator comprising a demodulator circuit 300 is illustrated in accordance with an embodiment of the present subject matter. While the demodulator circuit 300 is described herein with application to M-ary quadrature amplitude modulation (QAM), it is to be understood that the demodulator circuit 400 may be utilized with various types of demodulators such as those applicable to phase shift keying (PSK) and multiple values thereof (i.e., M-state), quadrature phase shift keying (QPSK), as well as QAM, and multiple values thereof (i.e., M-ary).

The demodulator circuit 300 receives a modulated IF signal 310. The modulated IF signal 310 is provided to complex multipliers 320, 322 which provide baseband I and Q component signals 324 and 326, respectively. A sine/cosine look-up table (LUT) 330 provides sine and cosine signals, sin(x) and cos(x), 316 and 318 respectively, to the complex multipliers 320, 322. The phase components of the sine and cosine signals are such that the multiplication of the modulated IF signal 310 to form I and Q components followed by an appropriate filtering 340, 341 (i.e., low pass, loop or other well known filters) provide I and Q signals 342 and 344, respectively.

The signals 342, 344 are provided to an equalizer 350 which processes the signals and passes equalized signals to a carrier recovery portion 360 of the demodulator circuit 300. Broadly, the equalizer 350 processes and/or filters the received signals 342, 344 to reduce or eliminate intersymbol interference (ISI). An equalizer according to an embodiment of the present subject matter may conduct maximum likelihood sequence estimation, filter equalization (i.e., linear, non-linear filters), or other forms of equalization known in the art. The carrier recovery portion 360, as is known in the art, creates a reference signal for input into the LUT 330 which, in turn, outputs a signal 316 having a frequency that is substantially the same as the carrier frequency and is in phase with the carrier signal, and outputs a signal 318 having a frequency that is substantially the same as the carrier frequency but is out of phase (quadrature) with the carrier signal. The carrier recovery portion 360 provides equalized I and Q signals 362 and 364, respectively, from the equalizer 350 to multilevel comparators 372, 374 and a signal quality estimation circuit 376. Of course, the demodulator circuit 300 may include various other components such as a slope equalizer, a DC offset compensation circuit, converters, gain compensation circuits, clock recovery circuits, demapper circuits, forward error correction circuits, and combinations thereof, as well as other demodulator components known in the art. Furthermore, the sensing connections for the signal quality estimation circuit 376 may be moved to the output of the filters 340, 341 or the output of the equalizer 350. The demodulator circuit 300 may thus accurately estimate the signal quality for different modulation levels and different FEC coding schemes such as 2D TCM, 4D TCM, Reed Solomon code, and concatenation of TCM and Reed Solomon code. Of course, the demodulator circuit 300 may be implemented through hardware or software or a combination of both hardware and software.

Figure 4:
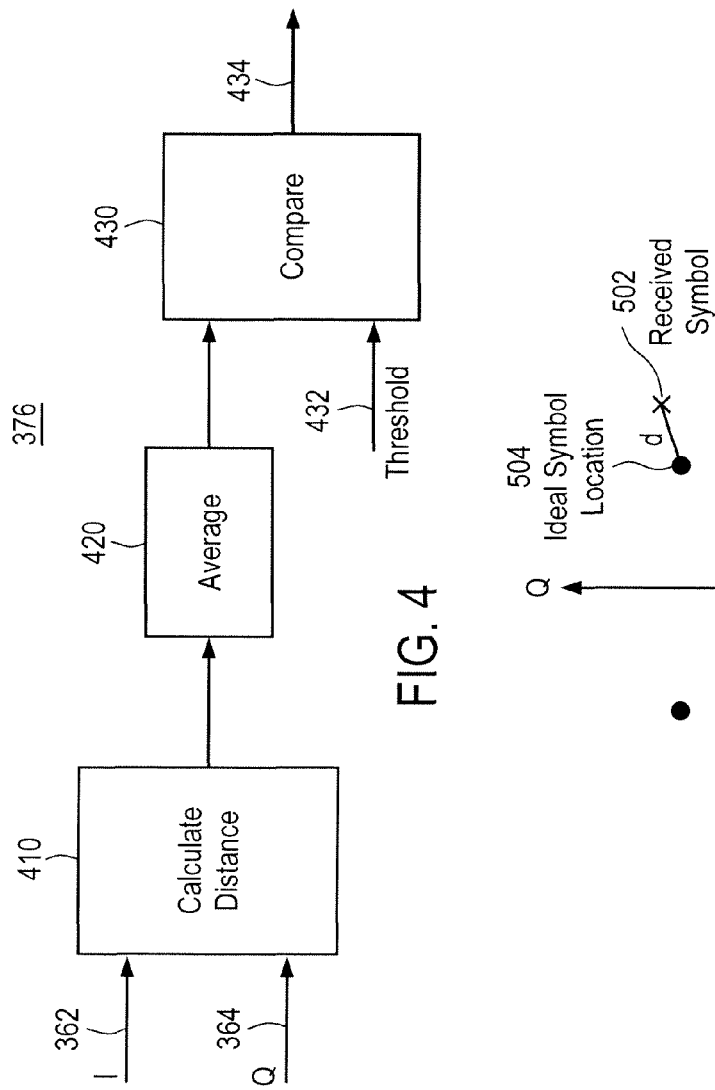
FIG. 4 is a functional block diagram of a signal quality estimation method according to an embodiment of the present subject matter.

FIG. 4 is a functional block diagram of a signal quality estimation circuit 376 according to an embodiment of the present subject matter. With reference to FIG. 4, an estimation circuit continuously monitors the quality of the received signals 362, 364 provided by the carrier recovery portion 360 and declares an alarm 434 when the quality is below a certain level As represented by block 410, the signal quality estimation circuit determines the distance between a received symbol and an ideal symbol that would have been received if there was no impairment of the signal. This impairment may be the result of thermal noise, signal distortion due to multipath fading (selective fading), interference, etc. As represented by block 420, the signal quality estimation circuit determines an average distance between the distances between successive received symbols and the corresponding ideal symbols. As represented by block 430, the signal quality estimation circuit compares the average distance to a predetermined threshold.

Figure 5:
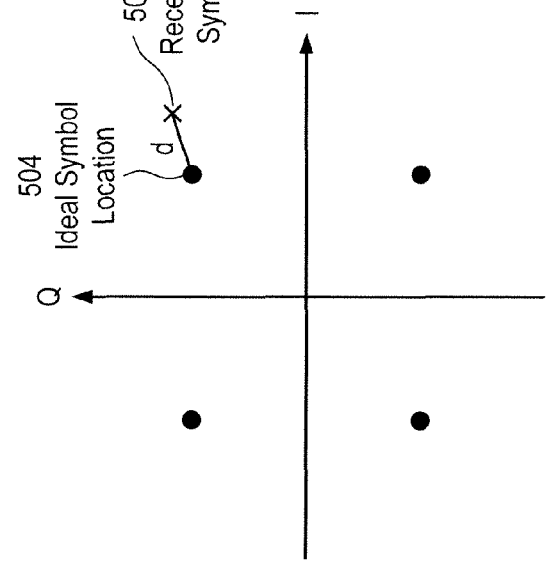
FIG. 5 is an illustration of the ideal constellation points of a 4 QAM modulation method having a received symbol in the (1,1) quadrant.

For example, FIG. 5 illustrates ideal constellation points of a 4 QAM constellation with a received symbol 502 in the (1,1) quadrant. A signal quality estimation circuit according to an embodiment of the present subject matter may determine a signal quality metric as a function of the distance (d) between the received symbol location 502 and a predetermined ideal symbol location 504. For example, the higher the distance (d), the lower the quality of the baseband signal. By monitoring successive received symbols, determining the distance between the successive received symbols and the predetermined ideal symbol location associated therewith 410, the estimation circuit may determine an average distance 420 for the measured distance determinations and compare 430 the average distance against a predetermined threshold 432. If the predetermined threshold 432 is exceeded then the estimation circuit produces an alarm 434. A further embodiment of the signal quality determination according to the present subject matter comprises determining, for each of n symbols of a signal, a distance between a location of the symbol and an associated predetermined ideal symbol location, determining a sum of the distances for the n symbols, and dividing the sum by n. The sum divided by n will be compared to the predetermined threshold 432 and an alarm produced 434 if the predetermined threshold is exceeded.

Figure 6:
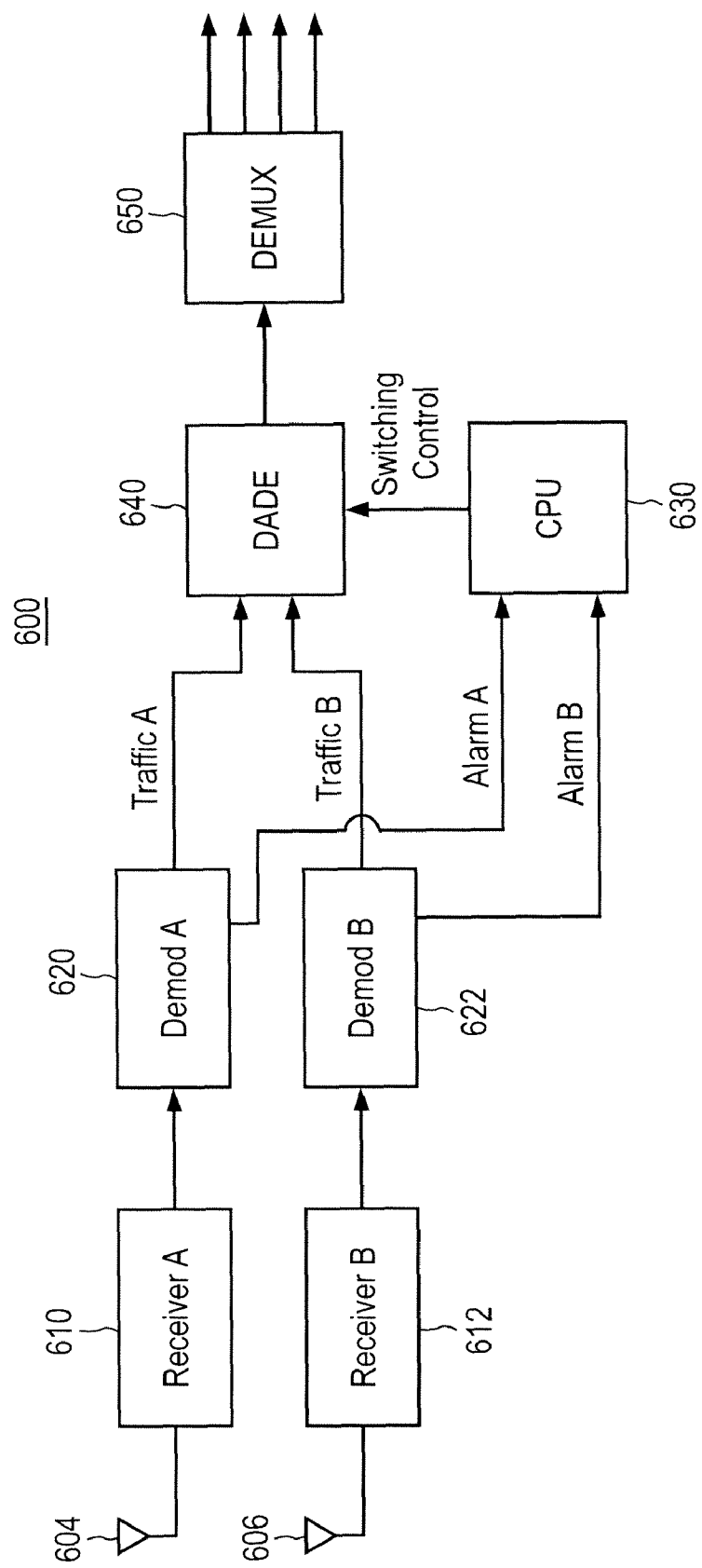
FIG. 6 is a simplified block diagram of a 1+1 SD configuration according to an embodiment of the present subject matter.

FIG. 6 is a simplified block diagram of a communications system employing a 1+1 SD configuration according to an embodiment of the present subject matter. With reference to FIG. 6, a communications system 600 employing a 1+1 SD configuration is illustrated where a constant bit rate signal or RF carrier is being transmitted while two antennas 604, 606 are utilized to receive the signal. Each antenna provides its respective received signal to an associated receiver 610, 612. The antennas 604, 606 may be physically displaced, to thereby achieve a space diversity effect. Any of the receivers may operate in a full duplex communication system and may also comprise part of a communication node that transmits and receives constant bit rate data in a full duplex mode with other communication nodes (not shown).

Figure 7:
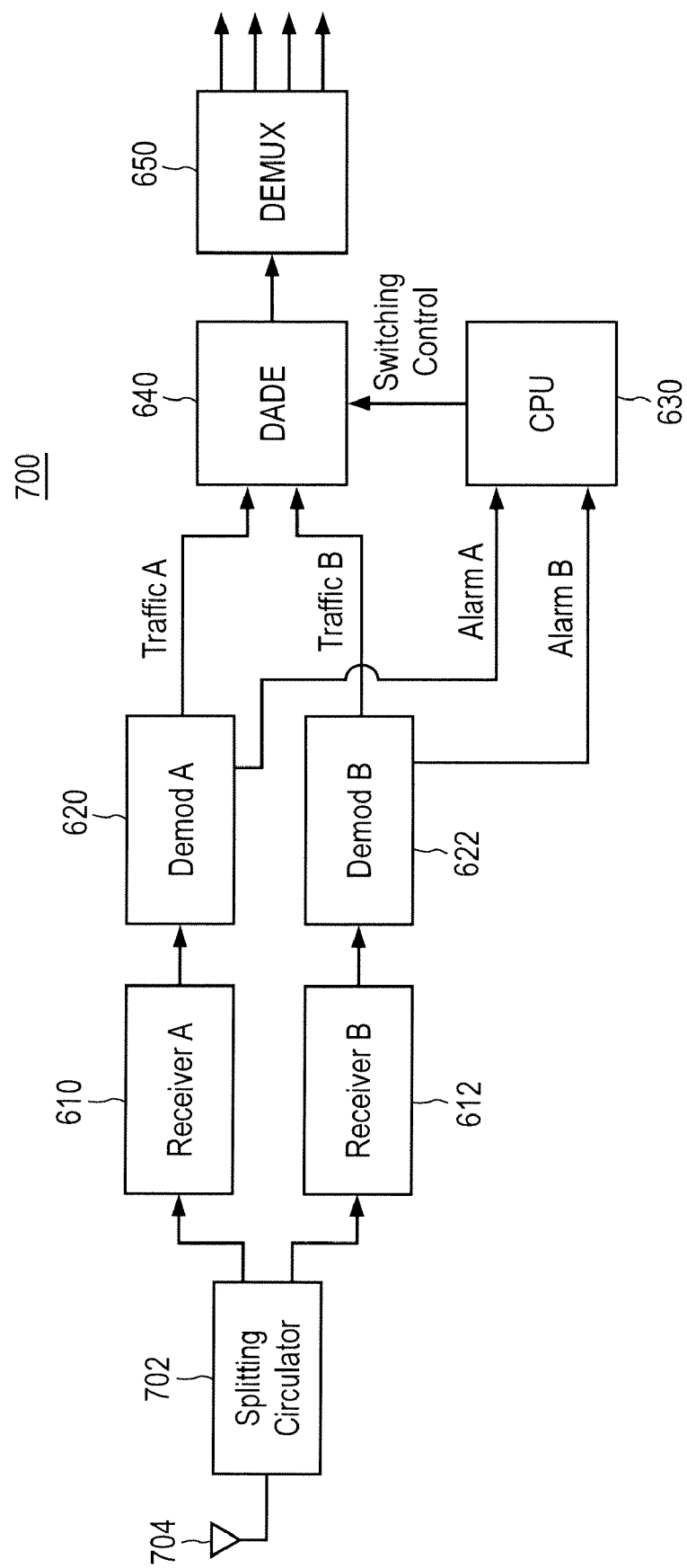
FIG. 7 is a simplified block diagram of a 1+1 FD configuration according to an embodiment of the present subject matter.

FIG. 7 is a simplified block diagram of a communications system employing a 1+1 FD configuration according to an embodiment of the present subject matter. With reference to FIG. 7, a communications system 700 employing a 1+1 FD configuration is illustrated where data is transmitted redundantly through two different carriers via a single antenna 704. The antenna 704 provides a received constant bit rate signal to a splitter circulator 702 which splits and distributes the signal to associated receivers 610, 612. Any of the receivers may operate in a full duplex communication system and may also comprise part of a communication node that transmits and receives constant bit rate data in a full duplex mode with other communication nodes (not shown).

With reference to FIGS. 6 and 7, modulated signals are provided by the receivers 610, 612 to associated demodulators 620, 622 to recover and demodulate the data. The signals may be converted to baseband signals in components of the demodulators 620, 622 or by a separate converting circuit (not shown). After further signal processing, the two redundant data streams may be provided by the demodulators 620, 622 to a Differential Absolute Delay Equalizer (DADE) circuit 640. Alarm information provided by the signal quality estimation circuit 376 from the respective demodulator may be supplied to a radio controller or control processing unit (CPU) 630. Embodiments of the CPU 630 may poll the alarm signal 434 provided by the signal quality estimation circuit 376 at predetermined intervals, e.g., 1 msec, 5 msec, 10 msec. Of course, the CPU 630 may receive a continuous signal from the alarm signal 434 or may poll the alarm signal 434 at different intervals than those identified and such examples are not intended to limit the scope of the claims appended hereto. The CPU 630 utilizes the alarm information alone or in combination with other information such as IF spectrum or signal slope information, BER information, signal degrade information based on data derived from FEC decoding processes, and signal outage information to provide a switching decision to the DADE circuit or another suitable switching circuit based on a preset switching request priority. A switching request priority for a receiver switching algorithm according to an embodiment of the present subject matter, listed from highest priority to lowest priority, may comprise: force switched, BER or frame loss alarm, signal degrade alarm, IF slope alarm, and receiver signal level (RSL) low alarm sensed at a radio antenna port.

The DADE circuit 640 compensates for any delay between the two data streams provided by the receivers and aligns the data streams so that a data transition from an active channel to a standby channel occurs without error. For example, when switching occurs, the two data streams provided by the receivers must be aligned so that the transition of data from one receiver to the data from a second receiver occurs without error. The DADE circuit may comprise two delay flip-flop buffers. One buffer delays data signals from one receiver and the second buffer delays data signals from the second receiver. Since the signal carried by the two receivers possesses disparate paths (i.e., the signals pass through different hardware), there exists some delay between the two signals. The DADE circuit may constantly monitor and align the two data streams from the two receivers. The active channel or receiver buffer will be read and outputted at the center of the buffer while the data from the standby channel or receiver is altered to possess the same delay as that of the active channel or receiver. The DADE circuit may also dynamically correct the delay alignment if one or both receivers experience a multipath (selective) fading that sifts the data around. When switching occurs, the selected buffer outputs the data to the following circuit for further processing. Since the two incoming signals to the DADE circuit possess different delay and phase, the read clock for both buffers is synchronized by the incoming clock of the selected channel. In the event of a sudden phase jump of the read clock resulting in a phase hit and synchronization loss for the following circuit, the phase transition of the read clock should be slow enough to mitigate any phase hits. This may be achieved by appropriately utilizing a phase locked loop.

An exemplary communications system according to an embodiment of the present subject matter receives a constant bit rate signal at the antennas which is then provided to the receivers. The constant bit rate signal received by the receivers is converted to a first baseband signal and a second baseband signal, respectively, and the demodulator estimates a signal quality metric of the first baseband signal, compares the signal quality metric to a predetermined threshold, and provides alarm information to the CPU. The CPU evaluates the alarm information provided by the demodulator and provides switching control information to the DADE circuit or other suitable switching circuit if the signal quality metric exceeds a predetermined threshold to thereby switch from the first baseband signal to the second baseband signal. The demodulator may estimate the first signal quality metric by determining a first distance between a location of a first symbol of the first baseband signal and a first predetermined ideal symbol location, determining a second distance between a location of a second symbol of the first baseband signal and a second predetermined ideal symbol location, and determining an average distance for the first and second distance determinations whereby the average distance may be compared to the predetermined threshold to generate the alarm information.

In a further embodiment, the demodulator may estimate the first signal quality metric by determining, for each of n symbols of the first baseband signal, a distance between a location of the symbol and an associated predetermined ideal symbol location, determining a sum of the distances for the n symbols, and dividing the sum by n whereby the sum divided by n may be compared to a predetermined threshold to generate the alarm information.

A communications system according to a further embodiment of the present subject matter receives a constant bit rate signal at the antennas which are then provided to the receivers. The constant bit rate signal received by the receivers is converted to a first baseband signal and a second baseband signal, respectively. A first demodulator estimates a signal quality metric of the first baseband signal, and a second demodulator estimates a signal quality metric of the second baseband signal. The CPU compares the first signal quality metric to the second signal quality metric and provides switching control information to the DADE circuit or another suitable switching circuit if the signal quality metric exceeds a predetermined threshold to thereby switch from the first baseband signal to the second baseband signal. The first demodulator may estimate the first signal quality metric by determining a first distance between a location of a first symbol of the first baseband signal and a first predetermined ideal symbol location, determining a second distance between a location of a second symbol of the first baseband signal and a second predetermined ideal symbol location, and determining a first average distance for the first and second distance determinations. The second demodulator may estimate the second signal quality metric by determining a third distance between a location of a first symbol of the second baseband signal and a third predetermined ideal symbol location, determining a fourth distance between a location of a second symbol of the second baseband signal and a fourth predetermined ideal symbol location, and determining a second average distance for the third and fourth distance determinations whereby the first average distance may be compared to the second average distance to generate the alarm information.

In a further embodiment, the first demodulator may estimate the first signal quality metric by determining, for each of n symbols of the first baseband signal, a distance between a location of the symbol and an associated predetermined ideal symbol location, determining a first sum of the distances for the n symbols, and dividing the first sum by n. Similarly, the second demodulator may estimate the second signal quality metric by determining, for each of n symbols of the second baseband signal, a distance between a location of the symbol and an associated predetermined ideal symbol location, determining a second sum of the distances for the n symbols, and dividing the second sum by n whereby the first sum divided by n is compared to the second sum divided by n to generate the alarm information. Of course, the first and second signal quality metrics may be compared to predetermined thresholds rather than to each other. For example, the first signal quality metric may be compared to a predetermined threshold and if the first signal quality metric is greater than a predetermined threshold then the second signal quality metric may be compared to a predetermined threshold. If the second signal quality metric is less than the predetermined threshold, then the CPU may provide switching control information to the DADE circuit or another suitable switching circuit to thereby switch from the first baseband signal to the second baseband signal. However, if the second signal quality metric is greater than or equal to the predetermined threshold, the first signal quality metric may be compared to the second signal quality metric, and the CPU may provide switching control information to the DADE circuit or another suitable switching circuit to thereby switch from the first baseband signal to the second baseband signal if the first signal quality metric is greater than the second signal quality metric.

For example, when multipath occurs to a wide band spectrum, a slope with various steepness will occur to the affected spectrum while selective fading may sweep through the spectrum. With proper adaptive slope equalization, the slope in the spectrum may be corrected to a certain extent. When slope equalization reaches its correction limit, a slope alarm will be declared, which may be used to switch to a standby receiver. However, when the spectrum is narrow, relatively flat fading occurs during multipath occurrence. Thus, slope alarm may not be as reliable against multipath occurrences for narrow band signal.

By way of further example, FEC decoding generates syndromes for convolutional decoders or corrected symbols in Reed Solomon decoders when transmission errors occur, which may be used to trigger receiver switching. However, comparing the relative signal quality between the two may be a relatively slow process. Thus, switching from this information may be too slow to ensure a reliable errorless switch for lower capacity data during fast fading periods. Thus, other events may be used to initiate receiver switching, such as BER alarm, etc. Thus, in another aspect of the present subject matter, a signal quality degrade threshold to trigger the switching may be set such that an alarm will be triggered before any error appears at an FEC decoder output.

In a multipath environment, selective fading may sweep through a receiver antenna with progressive speed. However, with a 1+1 protected FD system 700 according to an embodiment of the present subject matter, the two RF carriers are sufficiently separated in frequency and thus, the signal distortion will occur to one carrier and then to the next carrier, but not both simultaneously. Furthermore, with a 1+1 protected SD system 600 according to an embodiment of the present subject matter, the two receive antennas 604, 606 are properly displaced and thus, selective fading will affect one of the two antennas, but not both simultaneously. Thus, with FD or SD systems or combinations thereof, error free data transmission can be ensured even during severe path disturbance period.

In a further aspect of the present subject matter, the system may incorporate Adaptive Time Domain Equalization (ATDE) and/or forward error correction (FEC) such that the alarm information and subsequent receiver switching will occur before any error occurs to output data during signal path fading (selective or flat fading). Thus, in conjunction with a DADE circuit, switching from a degraded active channel to a good standby channel may be completed without any error.

Although embodiments of the present subject matter have been described with application to 4 QAM, it is to be understood that the present subject matter is applicable for M-ary QAM systems and M-state PSK systems, i.e., embodiments of the present subject matter may be utilized in any M-ary QAM demodulator (M=4, 8, 16, 32, 64, 128, 256, etc.) and may be utilized in any M-state PSK demodulator (M=2, 4, 8, 16, 32, 64, 128, 256, etc.). Furthermore, it is to be understood that embodiments of the present subject matter may also be utilized in any non conventional 2 dimensional (I-Q) modulation.

As shown by the various configurations and embodiments illustrated in FIGS. 1-7, the system and method for receiver switching based on signal quality estimation according to the present subject matter may be utilized for selecting antennas, channels or receivers in a multipath environment without incurring any errors in a received signal.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:
1. A system comprising:
a first complex multiplier and a second complex multiplier, the first complex multiplier configured to receive an input signal and provide a baseband I component signal, the second complex multiplier configured to receive the input signal and provide a baseband Q component signal; a first filter configured to filter the baseband I component signal;
a second filter configured to filter the baseband Q component signal; an equalizer configured to equalize the filtered baseband I component signal and to equalize the filtered baseband Q component signal;

a carrier recovery portion configured to generate a reference signal based on the equalized filtered baseband I component signal and the equalized filtered baseband Q component signal;

a first multilevel comparator configured to receive the equalized filtered baseband I component signal from the carrier recovery portion and provide an output I signal for further demodulation;

a second multilevel comparator configured to receive the equalized filtered baseband Q component signal from the carrier recovery portion and provide an output Q signal for further demodulation; and a signal quality estimation circuit configured to estimate a signal quality based on the equalized filtered baseband I component signal and the equalized filtered baseband Q component signal, the signal quality estimation circuit comprising:

a distance calculator configured to determine a distance between an ideal symbol and a received symbol of the equalized filtered baseband I component signal and the equalized filtered baseband Q component signal;

an average calculator configured to determine an average distance based on the distance from the distance calculator; the average distance being between successive received symbols and corresponding ideal symbols; and a comparator configured to compare the average distance to a predetermined threshold.

2. The system of claim 1, further comprising a lookup table (LUT) wherein the LUT provides a sine signal to the first complex multiplier and a cosine signal to the second complex multiplier.

3. The system of claim 2, wherein the sine signal and the cosine signal are based on the reference signal from the carrier recovery portion.

4. The system of claim 2, wherein the sine signal is substantially the same carrier frequency and is in phase with the input signal.

5. The system of claim 2, wherein the cosine signal is substantially the same carrier frequency and is in quadrature phase with the input signal.

6. The system of claim 1, wherein the signal quality estimation circuit is configured to receive the equalized filter baseband I component signal from the carrier recovery portion and receive the equalized filtered baseband Q component signal from the carrier recovery portion.

7. The system of claim 1, wherein the signal quality estimation circuit is further configured to generate an alert signal when a quality is low based on the comparison of the average distance to the predetermined threshold.

8. A method comprising:
multiplying an input signal with a sine signal to provide a baseband I component signal; multiplying the input signal with a cosine signal to provide a baseband Q filtering the baseband I component signal;
filtering the baseband Q component signal; equalizing the filtered baseband I component signal;
equalizing the filtered baseband Q component signal;
generating a reference signal based on the equalized filtered baseband I component signal and the equalized filtered baseband Q component signal;
comparing the equalized filtered baseband I component signal to provide an output I signal for further demodulation; and
comparing the equalized filtered baseband Q component signal to provide an output Q signal for further demodulation; and estimating a signal quality based on the equalized filtered baseband I component signal and the equalized filtered baseband Q component signal;

wherein estimating the signal quality comprises:

calculating a distance between an ideal symbol and a received symbol of the equalized filtered baseband I component signal and the equalized filtered baseband Q component signal;

calculating an average distance based on the distance from the distance calculator; and the average distance being between successive received symbols and corresponding ideal symbols;

comparing the average distance to a predetermined threshold.

9. The method of claim 8, further comprising generating the sine signal and the cosine signal with a lookup table (LUT).

10. The method of claim 9, wherein the sine signal and the cosine signal is based on the reference signal from the carrier recovery portion.

11. The method of claim 9, wherein the sine signal is substantially the same carrier frequency and is in phase with the input signal.

12. The method of claim 9, wherein the cosine signal is substantially the same carrier frequency and is in quadrature phase with the input signal.

13. The method of claim 8, wherein the signal quality estimation circuit is further configured to generate an alert signal when a quality is low based on the comparison of the average distance to the predetermined threshold.

14. A system comprising:
a means for multiplying an input signal with a sine signal to provide a baseband I component signal;
a means for multiplying the input signal with a cosine signal to provide a baseband Q component signal;
a means for filtering the baseband I component signal; a means for filtering the baseband Q component signal;
a means for equalizing the filtered baseband I component signal;
a means for equalizing the filtered baseband Q component signal; a means for generating a reference signal based on the equalized filtered baseband I component signal and the equalized filtered baseband Q component signal;
a means for comparing the equalized filtered baseband I component signal to provide an output I signal for further demodulation; and
a means for comparing the equalized filtered baseband Q component signal to provide an output Q signal for further demodulation I and a means for estimating a signal quality based on the equalized filtered baseband I component signal and the equalized filtered baseband Q component signal;
wherein estimating the signal quality comprises:
calculating a distance between an ideal symbol and a received symbol of the equalized filtered baseband I component signal and the equalized filtered baseband Q component signal;
calculating an average distance based on the distance from the distance calculator; the average distance being between successive received symbols and corresponding ideal symbols; and
comparing the average distance to a predetermined threshold.

* * * * *

UNITED STATES PATENT AND TRADEMARK OFFICE
CERTIFICATE OF CORRECTION

| | |
|---|---|
| PATENT NO. | : 8,090,056 B2 |
| APPLICATION NO. | : 12/503805 |
| DATED | : January 3, 2012 |
| INVENTOR(S) | : Tjo San Jao et al. |

It is certified that error appears in the above-identified patent and that said Letters Patent is hereby corrected as shown below:

Column 11, lines 22-25:

"an average calculator configured to determine an average distance based on the distance from the distance calculator; the average distance being between successive received symbols and corresponding ideal symbols; and"

should be changed to:

--an average calculator configured to determine an average distance based on the distance from the distance calculator, the average distance being between successive received symbols and corresponding ideal symbols; and--

Column 11, lines 51-56:
"multiplying an input signal with a sine signal to provide a baseband I component signal; multiplying the input signal with a cosine signal to provide a baseband Q"

should be changed to:

--multiplying an input signal with a sine signal to provide a baseband I component signal; multiplying the input signal with a cosine signal to provide a baseband Q component signal;--

Column 11, lines 61-63:

"comparing the equalized filtered baseband I component signal to provide an output I signal for further demodulation; and"

should be changed to:

Signed and Sealed this
Twentieth Day of March, 2012

David J. Kappos
*Director of the United States Patent and Trademark Office*

CERTIFICATE OF CORRECTION (continued)
U.S. Pat. No. 8,090,056 B2

--comparing the equalized filtered baseband I component signal to provide an output I signal for further demodulation;--

Column 12, lines 9-12:

"calculating an average distance based on the distance from the distance calculator; and the average distance being between successive received symbols and corresponding ideal symbols;"

should be changed to:

--calculating an average distance based on the distance from the distance calculator, the average distance being between successive received symbols and corresponding ideal symbols; and--

Column 12, lines 44-46:

"a means for comparing the equalized filtered baseband I component signal to provide an output I signal for further demodulation; and"

should be changed to:

--a means for comparing the equalized filtered baseband I component signal to provide an output I signal for further demodulation;--

Column 12, lines 47-52:

"a means for comparing the equalized filtered baseband Q component signal to provide an output Q signal for further demodulation I and a means for estimating a signal quality based on the equalized filtered baseband I component signal and the equalized filtered baseband Q component signal;"

should be changed to:

--a means for comparing the equalized filtered baseband Q component signal to provide an output Q signal for further demodulation; and
a means for estimating a signal quality based on the equalized filtered baseband I component signal and the equalized filtered baseband Q component signal;--

Column 12, lines 54-61:

"calculating an average distance based on the distance from the distance calculator; the average distance being between successive received symbols and corresponding ideal symbols; and"

should be changed to:

--calculating an average distance based on the distance from the distance calculator, the average distance being between successive received symbols and corresponding ideal symbols; and--